Oct. 15, 1968   T. D. LODE   3,405,979
VIBRATION ISOLATION

Filed April 19, 1965   2 Sheets-Sheet 1

INVENTOR.
TENNY LODE

Oct. 15, 1968     T. D. LODE     3,405,979
VIBRATION ISOLATION

Filed April 19, 1965     2 Sheets-Sheet 2

INVENTOR.
TENNY LODE

United States Patent Office 3,405,979
Patented Oct. 15, 1968

3,405,979
VIBRATION ISOLATION
Tenny D. Lode, 4925 Sherwood Road,
Madison, Wis. 53711
Filed Apr. 19, 1965, Ser. No. 448,990
5 Claims. (Cl. 308—6)

ABSTRACT OF THE DISCLOSURE

The subject of this application is a ball bearing structure which minimizes the transfer of vibration across the bearing. In one form, using solid bearing balls, the raceways are each in the shape of a V-groove with an included angle of 78½°. As shown in the specification, in this instance, the distance from the rolling axis of the ball to the ball contact points is equal to the radius of gyration of the ball. In the general case, where two plates form the ball bearing structure, the product of the distances from the rolling axis to the contact points of the ball, measured normal to the rolling axis, is equal to the square of the radius of gyration of the ball. Constructing the structure according to this teaching substantially reduces the transfer of vibration across the bearing as there will be no force due to the rolling kinematic reactions of the balls.

---

This invention relates to the isolation of mechanical vibrations and forces. More particularly, it relates to the construction of linear and/or angular ball bearing systems with a particularly low transmission of vibrations and forces.

The proper operation of many scientific instruments and other devices may be disturbed by vibration or other motion of their supporting structure. For example, sensitive galvanometers or analytical balances may give unsteady readings when vibrated or otherwise moved. It will frequently be desirable to isolate such instruments or devices from vibration or motion of their surroundings. In the example of a sensitive galvanometer, it may be desirable to isolate such an instrument even from the normally imperceptible vibration or motion of an entire laboratory building. A related problem is that many instruments and devices generate vibration during their normal operation. These motions or vibrations may be transmitted to the surroundings and may disturb the operation of other nearby instruments or devices. For example, centrifuges or environmental testing equipment designed to deliberately vibrate equipment under test may transmit vibrations to their surroundings.

An object of this invention is the isolation of a supported instrument or device from motion or vibration of the supporting structure. A further object is the isolation of a supporting structure from vibration or motion of a supported instrument or device.

In a particular form of the present invention, an upper and lower plate are separated by bearing balls contained within V-shaped grooves. As will be shown later in this specification a particular relationship between the groove angles will minimize the transmission of vibration due to inertial reaction of the bearing balls. One such relation will be for the included angles of the bearing grooves to be all equal to 78½°.

Figure 1:
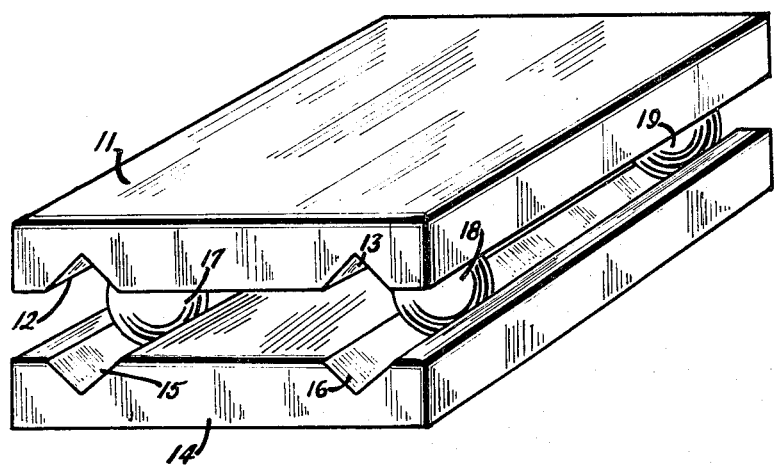
FIGURE 1 is a pictorial view of a first form of the invention illustrating a linear ball bearing system for the isolation of linear translational motion.

Referring now to the drawings, FIGURE 1 includes upper plate 11 with V-shaped grooves 12 and 13. Lower plate 14 similarly contains V-shaped grooves 15 and 16. Ball 17 rides in grooves 12 and 15 and supports plate 11 above plate 14. Balls 18 and 19 similarly ride in grooves 13 and 16 and support plate 11 above plate 14. If desired, additional balls may be used in the structure of FIGURE 1. For example, to maintain symmetry, an additional bearing ball may be placed in grooves 12 and 15 diagonally opposite ball 18.

Figure 2:
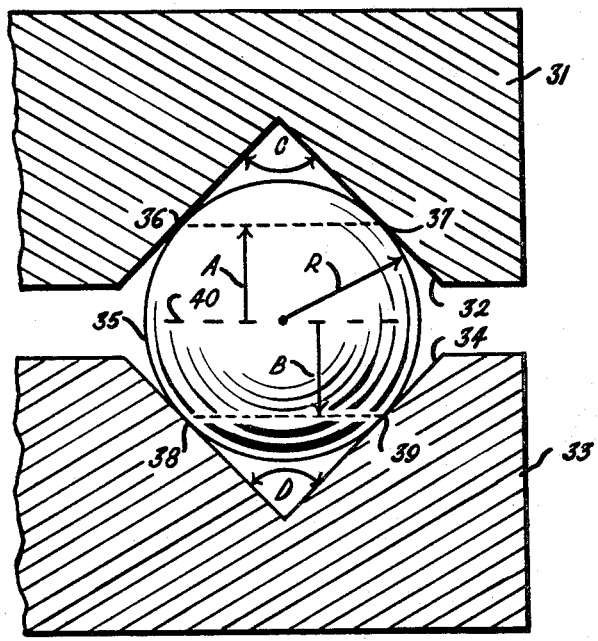
FIGURE 2 is a section view corresponding to the structure of FIGURE 1 showing certain angles and distances in greater detail.

Reference is now made to FIGURE 2 which is a section view corresponding to the structure of FIGURE 1 showing certain angles and distances in greater detail. In FIGURE 2, upper plate 31 contains V-shaped groove 32 and lower plate 33 contains V-shaped groove 34. Ball 35 contacts groove 32 at rolling contact points 36 and 37 and similarly contacts groove 34 at rolling contact points 38 and 39. The normal rolling axis of ball 35 is designated by dotted line 40. For convenience in subsequent use in equations, certain angles and distances of FIGURE 2 are designated by letters. The radius of ball 35 is designated by R. The distance from rolling axis 40 to upper contact points 36 and 37 is represented by A while the distance from rolling axis 40 to lower contact points 38 and 39 is represented by B. The included angles of grooves 32 and 34 are represented by C and D respectively. The structure of FIGURE 2 corresponds to the structure of FIGURE 1 in the immediate vicinity of any of the individual bearing balls. For example, upper plate 31, groove 32, lower plate 33, groove 34 and ball 35 of FIGURE 2 may correspond respectively to upper plate 11, groove 13, lower plate 14, groove 16 and ball 18 of FIGURE 1.

The angles and distances of FIGURE 2 will be related in accordance with the trigonometric equations:

$$A = R \sin(C/2)$$
$$B = R \sin(D/2)$$

Let us assume that lower plate 33 of FIGURE 2 moves parallel to grooves 32 and 34 with a linear acceleration of magnitude X. This will be a motion perpendicular to the plane of the drawing sheet. The resulting forces upon ball 35, from plates 31 and 33, will be parallel to the direction of grooves 32 and 34 and may be represented as $Fa$ and $Fb$ respectively. The linear acceleration of the center of mass of ball 35 due to motion of plate 33 will be $XA/(A+B)$. The corresponding angular acceleration of ball 35 will be $X/(A+B)$. From mechanics, the linear and angular equations corresponding to force equals mass times acceleration may be written as:

$$Fa + Fb = MXA/(A+B)$$
$$-AFa + BFb = IX/(A+B) = (2MR^2/5)X(A+B)$$

where M is the mass of ball 35 and I is its moment of inertia about its center. In the case of a sphere, the moment of inertia about the center is $I = (2MR^2/5)$. If we set $Fa$ equal to zero, the force equations may be combined and solved for the relation:

$$AB = (2/5)R^2$$

From the trigonometric relations above, this is equivalent to:

$$\sin(C/2)\sin(D/2) = 2/5$$

If groove angles C and D are related as above, motion or vibration of lower plate 14 of FIGURE 1 in a direction parallel to grooves 15 and 16 will not transmit force or vibration to upper plate 11. In a similar manner, motion or vibration of upper plate 11 in a direction parallel to grooves 15 and 16 will not transmit vibration or force to lower plate 14.

It is of interest to solve the preceding equation for two particular cases; first, for equal groove angles and second, for the case in which one groove has become a flat surface corresponding to a groove angle of 180°. In the first case, with equal groove angles, the relation becomes:

$$\sin^2(C/2) = \sin^2(D/2) = 2/5$$

which may be solved as:

$$C = D = 78\tfrac{1}{2}°$$

For the second case, we may assume that angle D is equal to 180°. Angle C is then given by:

$$C = 2\arcsin(2/5) = 47°$$

Equivalent results would be obtained if angle C were considered as equal to 180° and angle D taken as 47°.

Figure 3:
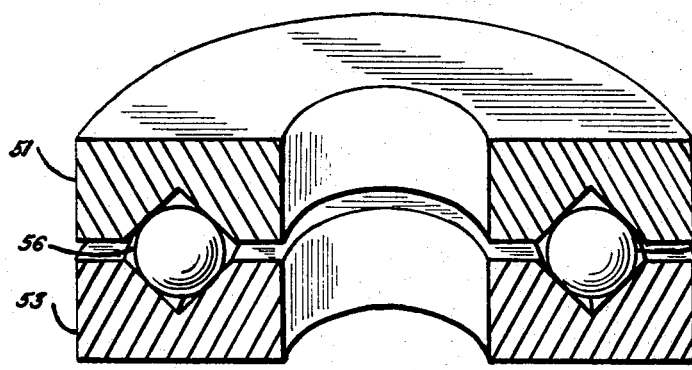
FIGURE 3 is a section view and pictorial illustration of a second form of the invention showing its application for the isolation of rotary vibration or motion.
Figure 5:
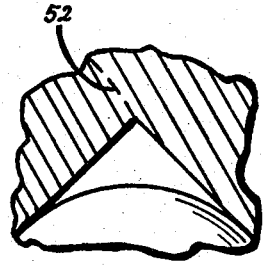
FIGURE 5 is a fragmentary enlarged sectional view showing the groove in the upper member of FIGURE 3 and a fragment of the ball riding in the groove.
Figure 6:
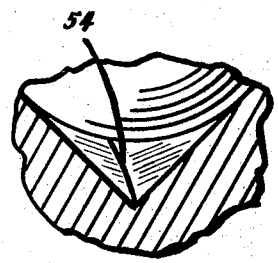
FIGURE 6 is a fragmentary enlarged sectional view showing the groove formed in the lower member of FIGURE 3 and a portion of the ball riding in the groove.

Reference is now made to FIGURE 3 which is a section view and pictorial illustration of a second form of the invention showing its application to the isolation of rotary vibration or motion. In FIGURE 3, ring 51 includes V-shaped groove 52, and ring 53 includes V-shaped groove 54. Ringes 51 and 53 are separated by balls 55 and 56. Additional bearing balls not specifically shown in FIGURE 3 may be used.

In operation, the structure of FIGURE 3 functions as a rotational ball bearing with the additional feature of a reduced transmission of rotational forces or vibrations through the bearing. The section view of FIGURE 2 may also apply to the structure of FIGURE 3. Plates 31, groove 32, plate 33, groove 34 and ball 35 of FIGURE 2 may correspond to ring 51, groove 52, ring 53, groove 54 and ball 55 of FIGURE 3 respectively. The desired relations between the included angles of grooves 52 and 54 are the same as previously derived for the structure of FIGURE 1.

Figure 4:
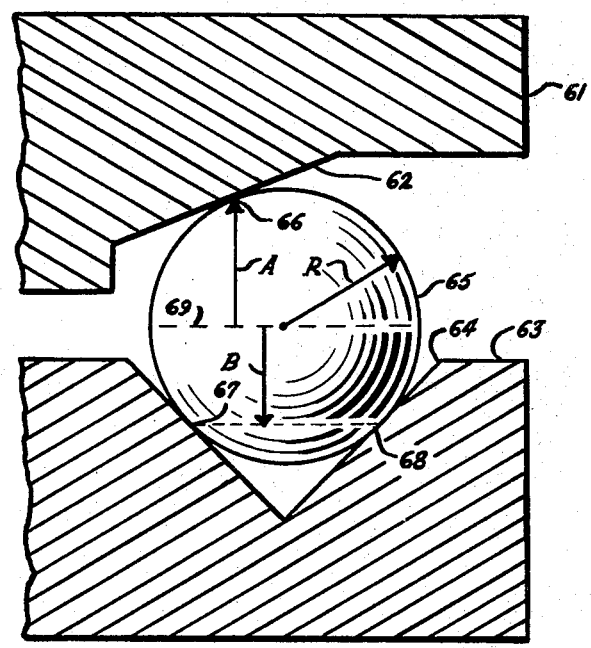
FIGURE 4 is a section view illustrating a third form of the invention.

Reference is now made to FIGURE 4 which is a section view illustrating a third form of the invention. In FIGURE 4, upper plate 61 includes bearing surface 62, and lower plate 63 includes V-shaped groove 64. Ball 65 rides in groove 64 and supports plate 61 at contact point 66. Ball 65 contacts groove 64 at points 67 and 68. Dotted line 69 indicates the normal rolling axis of ball 65.

The structure of FIGURE 4 generally resembles the structure of FIGURE 2 except for the modification of plate 61 so as to have only a single contact with ball 65 at point 66. As before, the radius of ball 65 is denoted by R, the distance of contact point 66 from axis 69 is denoted by A, and the distance of contact points 67 and 68 from axis 69 is designated by B. A structure of the type shown in FIGURE 4 may be advantageous in certain applications such as the construction of certain types of scientific instruments since it allows some freedom of sideways motion of plate 61 with respect to plate 63.

The proper relationship between distances A, B, and R for vibration isolation are as derived in connection with the structure of FIGURE 2. In general, it will be desirable to have distance A be somewhat greater than distance B so that pressure on contact point 66 will tend to keep ball 65 seated in groove 64.

The preceding description has shown that vibration isolation may be achieved with uniform bearing balls if the product of the distances from the rolling axis of the balls to the contact points is 2/5 of the square of the ball radius. This derivation was based on the assumption that the bearing balls were uniform spheres. The 2/5 factor arose from an expression for the moment of inertia of a uniform density sphere. The method and means of vibration isolation may be generalized to include the possible use of non-uniform density spheres. For example, one may use bearing balls with lighter or more dense cores, or hollow bearing balls. In such instances, it is convenient to introduce the radius of gyration K of the bearing ball. The radius of gyration is defined such that the square of the radius of gyration times the mass of the bearing ball is equal to its angular moment of inertia about its center. The condition for vibration isolation then becomes that the product of the two distances from the rolling axis to the contact points be equal to the square of the radius of gyration. Stating this in the form of an equation, $$AB = K^2$$

To determine the proper A and B distances and the associated groove angles, it is only necessary to determine the radius of gyration K for the particular bearing balls used.

FIGURE 1 has illustrated a particular form of linear ball bearing system, while FIGURE 3 has illustrated a particular form of rotary ball bearing system. Many other forms of ball bearing systems may be devised within the spirit of this invention. For example, rotary ball bearings may be constructed with a set of bearing balls between inner and outer grooved structures.

The drawings have illustrated a structure employing bearing balls in simple V grooves for the isolation of motion or vibration along one translational direction. Several such structures placed one on top of another or otherwise combined could be used for the simultaneous isolation of vibration in several directions. The drawings have shown the use of simple V-shaped and flat grooves. More complex groove shapes, or other means of providing a rolling contact with a bearing ball at a controlled distance from the rolling axis may be employed.

What is claimed is:

1. Vibration isolation means including first and second mechanical members, and a plurality of substantially similar bearing balls, said first and second members each having surfaces defined therein and forming a V-shaped channel for said bearing balls, said bearing balls being between said first and second members, in rolling contact with said members and riding in said channels, the surfaces which form each of said channels being oriented such that the product of the distance from the rolling axis of said ball to a contact point with said first member and the distance from said rolling axis to a contact point with said second member is substantially equal to the square of the radius of gyration of said bearing balls, said distances being measured normal to said rolling axis.

2. Vibration isolation means including first and second mechanical members, at least one of said members having a channel defined therein and a bearing ball between said members and in rolling contact with each of said members, said ball being positioned in the channel and contacting the member having the channel on at least two spaced points, said ball having a rolling axis when the two members are moved relative to each other, and means to position the contact points between the ball and the members to substantially fulfill the formula $AB = K^2$, wherein A is the distance from the rolling axis of said ball to a contact point with said first member, B is the distance from said rolling axis to a contact point with said second member and K is the radius of gyration of said ball, said distances being measured normal to said rolling axis.

3. The combination as specified in claim 2 wherein said bearing ball is a sphere of uniform density and wherein $K^2 = \tfrac{2}{5}R^2$ where R is the radius of the ball.

4. Vibration isolation means including first and second mechanical members, said first member having a pair of surfaces defining a V-shaped channel, a bearing ball positioned in said channel, said second member having at least one surface riding against said bearing ball, said bearing ball being free to roll to permit movement between said first and second members, and having a rolling axis through its center when the two members are moved relative to each other, and means to position said surfaces of said members so that the contact points between said ball and said members fulfill the formula $AB=K^2$, wherein A is the distance from the rolling axis of said ball to a contact point with said first member, B is the distance from said rolling axis to a contact point with said second member, both A and B being measured normal to said rolling axis, and K is the radius of gyration of said bearing ball.

5. The combination as specified in claim 1 wherein said surfaces defining the V-shaped channels in each of said first and second members form an included angle of 78½°.

References Cited

UNITED STATES PATENTS

| 714,612 | 11/1902 | Rochester | 308—188 X |
| 2,467,870 | 4/1949 | Stephenson | 308—174 X |
| 3,093,424 | 6/1963 | Pernetta | 308—6 |

FOREIGN PATENTS

| 339,651 | 10/1919 | Germany. |
| 249,431 | 7/1912 | Germany. |
| 437,686 | 11/1926 | Germany. |
| 1,117,949 | 11/1961 | Germany. |

EVERETTE A. POWELL, Jr., *Primary Examiner.*